United States Patent [19]

Rumbach

[11] Patent Number: 4,526,537

[45] Date of Patent: Jul. 2, 1985

[54] APPARATUS FOR HEAT TREATMENT OF MATERIAL IN PIECES AT HIGH TEMPERATURE

[75] Inventor: Karl F. Rumbach, Hanau, Fed. Rep. of Germany

[73] Assignee: Agrob Anlagenbau GmbH, Ismaning, Fed. Rep. of Germany

[21] Appl. No.: 490,176

[22] Filed: Apr. 29, 1983

[30] Foreign Application Priority Data

May 6, 1982 [DE] Fed. Rep. of Germany ....... 3217176

[51] Int. Cl.³ .......................... F27D 3/00; B65G 29/00
[52] U.S. Cl. .................................... 432/239; 198/611; 414/150; 414/159; 432/246
[58] Field of Search ................ 432/239, 246; 414/110, 414/159, 150, 157; 198/611

[56] References Cited

U.S. PATENT DOCUMENTS

| | | | |
|---|---|---|---|
| 1,696,822 | 12/1928 | Tytus | 414/157 |
| 3,570,827 | 3/1971 | Breedon | 432/246 |
| 3,985,225 | 10/1976 | Baum et al. | 414/157 |
| 4,243,378 | 1/1981 | Chronberg | 432/246 |
| 4,381,108 | 4/1983 | Newsome | 198/817 |

FOREIGN PATENT DOCUMENTS 2829005 1/1980 Fed. Rep. of Germany ...... 432/239

Primary Examiner—John J. Camby
Attorney, Agent, or Firm—Learman & McCulloch

[57] ABSTRACT

The invention relates to apparatus for heat treatment of material in pieces at high temperature, especially for firing ceramic material. In this apparatus supports in the form of elongated support elements are provided on carrier elements rotatable about fixed axes, the supports are guided in the transport direction and are spaced a clear distance from one another at right angles to the transport direction. This results in even heat treatment of the material, a reduction in the energy consumption, shortening of the transit time, and a significant reduction in the construction and running costs.

15 Claims, 6 Drawing Figures

FIG.2
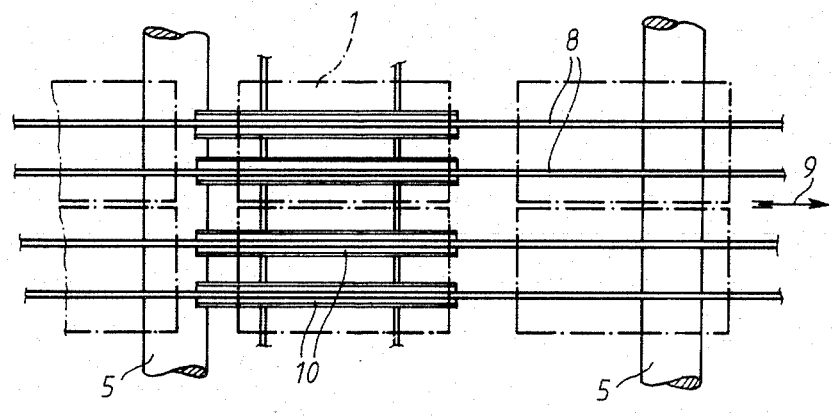
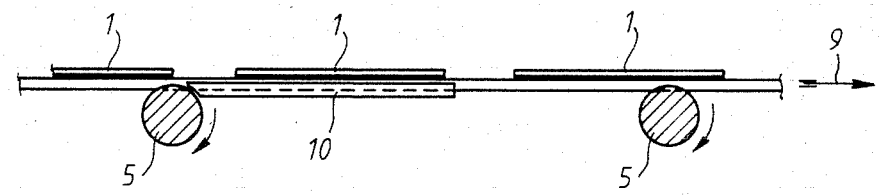
FIG.3

APPARATUS FOR HEAT TREATMENT OF MATERIAL IN PIECES AT HIGH TEMPERATURE

BACKGROUND OF THE INVENTION

The invention relates to apparatus for the high temperature heat treatment of pieces of material, especially ceramic material, and containing a heat treatment chamber having a number of rotating carrier elements which are arranged fixed and at least partially driven and a number of support elements which rest on the carrier elements and are transported through the heat treatment chamber with the material.

In the following description of the invention the firing of ceramic material has been selected as the sphere of application. However, the invention is not restricted to this sphere, but can also be used advantageously in the heat treatment of other material in pieces, for instance annealing and tempering of metal workpieces and in other high temperature heat treatment processes.

For firing ceramic material, roller kilns are known in which the material is conveyed through the tunnel-like kiln on a large number of rollers which are arranged in close succession one after the other. Such kilns have significant disadvantages. In order to avoid unacceptable deformation of the rollers and the ceramic material, the length and diameter of the rollers and thus, at a predetermined running speed also, the capacity of the kiln are restricted. The large number of driven rollers required results in high expenditure on equipment. Because of the necessary close arrangement of the carrier and conveyor rollers the introduction of the gaseous heating medium from above and below is uneven. Finally, glazed ceramic material cannot be fired in such roller kilns, since sticking and smearing of the rollers is unavoidable. Thus such roller kilns are severely limited in the quality of the glaze on the ceramic material to be fired.

Roller kilns are also known in which the ceramic material to be fired does not rest directly on the driven conveyor rollers but on individual carrier plates which in turn are supported on the conveyor rollers and are transported by the latter through the kiln. The size of these carrier plates corresponds to at least the surface area of the ceramic parts. A significant disadvantage of this is poor heating of the material to be fired from below and thus a generally uneven heat treatment of the ceramic material. A further disadvantage is that heating of the carrier plates to the high firing temperature as is necessary in each operation results in a very high energy consumption since the sensible heat from this auxiliary firing means cannot be recovered in practice. A further disadvantage of these known kilns is the relatively poor guiding of the carrier plates in the transport direction and the danger of the ceramic material sticking to the carrier plates.

Finally, the prior art also includes kilns in which the ceramic material to be fired rests on a number of steel wires which run parallel to one another through the tunnel-like kiln chamber and are guided at both ends of the kiln over revolving tension and transport wheels. In this kiln the relationship between the mass of the auxiliary firing means and the mass of the ceramic material and thus the energy requirement for heating the auxiliary firing means are substantially reduced; however, this known construction has further significant disadvantages. Since the wire used to support the ceramic material has no significant inherent rigidity, a plurality of support rollers must be provided and costly tensioning devices for the individual steel wires are also necessary. In view of the high mechanical and thermal stress to which the steel wires are exposed, wires are continually breaking in operation with all the disadvantageous consequences.

SUMMARY OF THE INVENTION

One object of the invention is to avoid the aforesaid shortcomings of the known constructions and to provide apparatus for high temperature heat treatment of piece material, especially apparatus for use in firing ceramic material, and in which the heat treatment of the material from all sides (especially from above and below) is made uniform while at the same time the energy consumption is reduced and the transit time is shortened but in which a sufficient stability of shape of the material is ensured in the high temperature zone. A further object of the invention is to provide a construction for such apparatus that can be produced at comparatively low cost and can operate at low running costs.

These objects are achieved according to the invention by the following features:

(a) the support for the piece material comprises a plurality of parallel sets of elongated support elements which are guided in the transport direction and are spaced a clear distance from one another at right angles to the transport direction;

(b) a support surface which is resistant to deformation due to thermal variations is provided for the material to be treated in the zone of highest temperature.

In the apparatus according to the invention the material rests with only a very small part of its surface area on the support elements, so an even introduction of the heating medium to the material is possible from all sides. As a result the heating of the material is made uniform and is accelerated and this has an advantageous effect both on the quality of the heat treatment, the transit time, and the energy consumption.

Since the ceramic material is supported on elongated support elements of adequate rigidity to resist appreciable deformation, the number of rotating carrier elements which are arranged fixed and at least partially driven can be significantly reduced by comparison with the prior art, which results in a considerable reduction in the cost of construction.

According to the invention a support surface which is resistant to thermal creep is provided for the material to be treated in the zone of highest temperature. As will be explained in greater detail below, there are numerous construction possibilities for this within the scope of the invention.

The construction of the sets of supports in the form of individual elongated support elements has the further advantage of easy manipulability for the necessary return of the support elements to the inlet end of the kiln.

In an advantageous embodiment of the invention, the rotating carrier elements in the zone of highest temperature are a smaller distance apart in the transport direction than in the other zones. In this way the necessary stability of shape of the support elements is ensured in all zones of the furnace with a minimum number of carrier elements.

According to the invention the following constructions of the support surface for the material to be treated in the zone of highest temperature are possible.

In a first variant the support surface is formed exclusively by the support elements the clear spacing of which is adapted to the rigidity (resistance to deformation) of the material in the zone of highest temperature. This variant is especially suited to material in which no deformation occurs under its own weight during firing outside the support surface. This applies for example to the second and third firings of ceramic tiles.

In a second variant the support surface for the material to be treated in the zone of highest temperature is formed exclusively by rotating carrier elements in the region of the clear distance between adjacent support elements. If for example guide tracks are provided in the carrier elements to guide the support elements in the transport direction, then in this second variant the depth of the guide tracks is conveniently chosen so that in the region of the zone of highest temperature it is greater and in the other zones it is less than the height of the support elements. In this way only the rotating carrier elements carry the material in the zone of highest temperature.

In a third variant the support surface for the material to be treated in the zone of highest temperature is formed both by the support elements and by the peripheral regions of the rotating carrier elements between adjacent support elements.

The second and third variants outlined above are especially adapted for material which can be deformed during firing under its own weight outside the surface supported by the support elements in the high temperature region. This applies for example to the firing of ceramic tiles.

The spacing or clear distance between the support elements (at right angles to the transport direction) amounts advantageously to a multiple of the width of the support elements (measured at right angles to the transport direction). Thus at least in large parts of the kiln the ceramic material only rests with a fraction of its surface area on the support elements and, as mentioned above, an additional support surface (formed by the rotating carrier elements in the region of the clear distance between adjacent support elements) is provided in case of need only in the zone of highest temperature in order to ensure a sufficient creep strength or thermal resistance of the material which tends to be deformed.

The guiding of the support elements in the transport direction essential to the apparatus according to the invention can be achieved by fixed guide elements which are provided in the region between carrier elements succeeding one another in the transport direction and have their upper edge lying lower than the upper edge of the support elements so that the fixed guide elements do not come into contact with the ceramic material resting on the support elements. The support elements can also be guided by guide tracks in the carrier elements.

When the support surface for the material to be treated in the zone of highest temperature is formed exclusively by rotating carrier elements provided in the region of the clear spacing between adjacent support elements, then according to the invention conveyor elements to drive the support elements are provided in this zone at least between individual carrier elements provided with guide tracks, the distance between succeeding conveyor elements being at most equal to half the length of the support elements. In this way each support element spans and rests on two adjacent carrier elements even in the zone of highest temperature.

The ends of the support elements are advantageously constructed as loose plug connection ends which are telescopic in the direction of transport and counteract bending. This ensures automatic coupling of the support elements in the region of the inlet end of the kiln and automatic release of succeeding support elements at the outlet end. At the same time the plug connection provides a form-locking connection of the support elements which is stiffened against bending.

The clear spacing between adjacent support elements is advantageously adjustable according to the invention for adaptation to the width of the material to be treated. This can be achieved either by cross-adjustment of the guide elements provided for longitudinal guiding of the support elements or by the use of a number of fixed guide elements or guide tracts suitable for all the formats in question.

The drive speed of the driven carrier elements is selected in the individual zones of the heat treatment apparatus so that over the whole length of the heat treatment chamber the support elements are under a slight force acting in the transport direction and are thus in force-locking connection. For this purpose it is generally appropriate to select a somewhat higher drive speed in the forward zones of the kiln than in the rear zones.

In order to achieve a sufficient transfer of force from the driven carrier elements to the support elements the surfaces of the support elements and the driven carrier elements which come into contact with one another are conveniently provided with a friction facing and/or a form-locking shape, especially in the heating zone.

Adjacent support elements at right angles to the transport direction are advantageously movable independently of one another in the transport direction. Even with variable thermal expansion this facilitates a stress-free movement of the individual rows of support elements through the kiln. It also simplifies the return transport of the support elements from the end to the beginning of the kiln. Within the scope of the invention, however, it is also possible for adjacent support elements at right angles to the transport direction to be connected by crosspieces to form latticed elements which are guided in the transport direction. The upper surface of the support elements can be shaped in order to support and/or carry the material. Projections formed by pins or similar elements which are inserted in a chosen position in openings in the support elements are particularly advantageous.

A material should be chosen for the support elements which is sufficiently stable in shape, resistant to corrosion, and free of scaling in the zone of highest temperature. Particularly suitable support elements are those made from ceramic, such as silicon carbide and porcelain, and also from chrome nickel steel, chrome aluminum steel, and chrome nickel aluminum titanium steel, which are resistant to creep or deformation due to temperature variations.

The apparatus according to the invention for heat treatment generally has the plan form of an elongated rectangle, the support elements being guided in a straight line and conveyed back from the outlet end of the heat treatment chamber to the inlet end. However, it is also possible within the scope of the invention for the heat treatment chamber to be given the plan form of a circular ring. Here the support elements are guided along a continuous circular track, the loading station and unloading station are immediately adjacent to one another, and return transport of the support elements to the inlet end of the heat treatment chamber is unnecessary.

DESCRIPTION OF THE DRAWINGS

The invention is illustrated schematically in the drawings, in which:

FIG. 2 is a plan view of a section of the carrier and conveying system;

FIG. 3 is a side view of the apparatus shown in FIG. 2;

DETAILED DESCRIPTION

Figure 1:
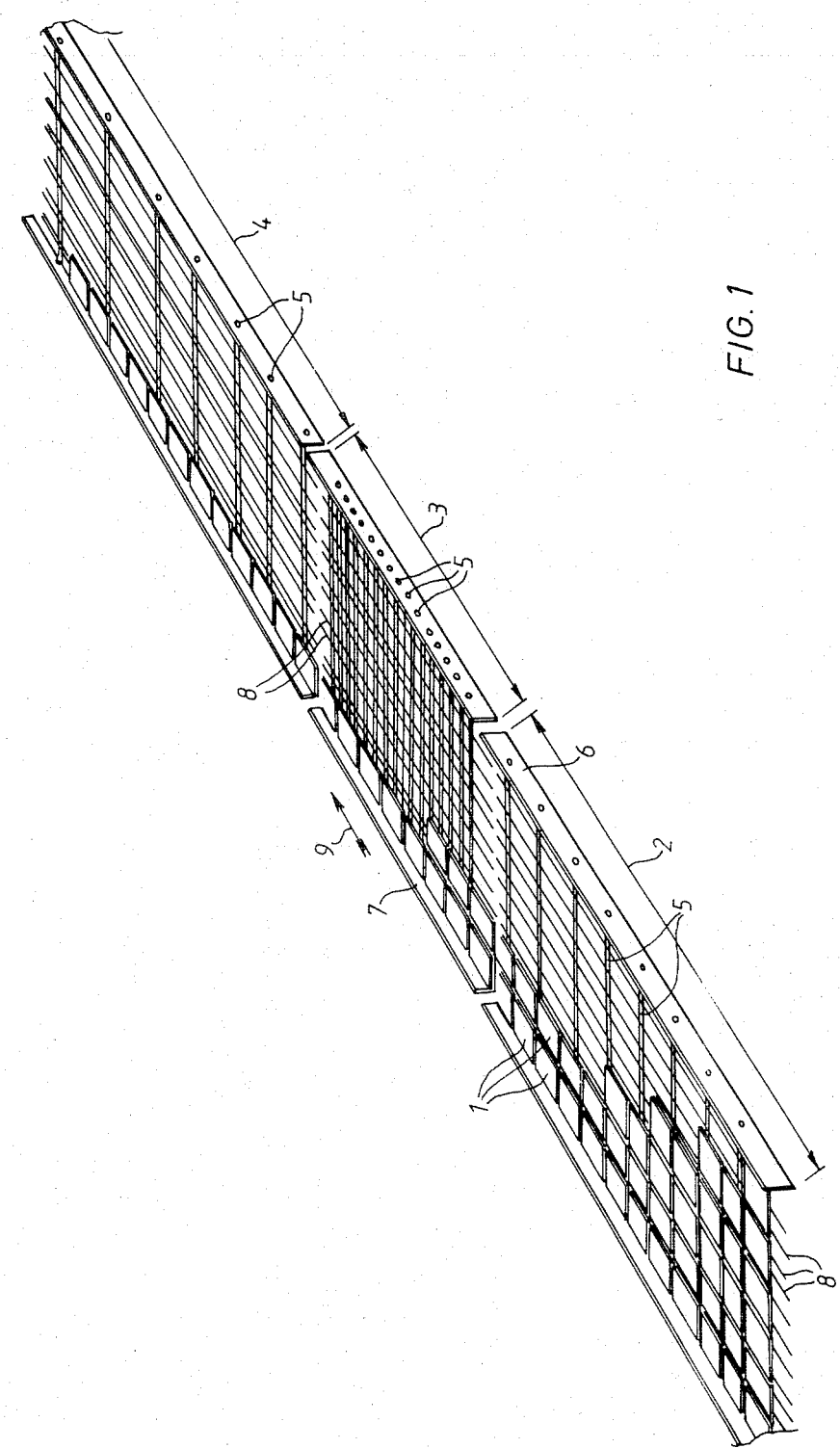
FIG. 1 is a schematic, isometric representation of the system of carrier elements and support elements arranged in a kiln according to the invention.

Of the kiln according to the invention only the transport system for the ceramic material, such as tiles 1, is shown in FIG. 1. The tunnel-like housing of the kiln, and means for heating the kiln, for loading and unloading the transport system, and for returning the auxiliary firing means (i.e., the support elements which will be described in greater detail below) are not shown.

The kiln is divided into several zones through which the ceramic material is passed in succession, for example a heating zone 2, a firing zone 3 and a cooling zone 4.

The material is transported by a number of rotating carrier elements 5 which are formed by cylinders or rollers and are mounted in lateral guide rails 6, 7 of the housing. As shown in FIG. 1, the distance between adjacent carrier elements 5 in the firing zone 3 is smaller than in the heating zone 2 and in the cooling zone 4. At least some individual rotating carrier elements 5 are driven; the drive means therefor are conventional and are not illustrated.

Piece material supports comprise a plurality of sets of spaced apart, parallel support elements 8 each of which is an elongated rod-like element of such length as to span two or more adjacent carrier elements. Each support element 8 typically is 2-4 m. in length and rests directly on the carrier elements.

As can be seen from FIGS. 2 and 3, guide rails 10 are arranged between successive rotating carrier elements 5 to guide the support elements 8 in the transport direction (arrow 9). As shown in FIG. 3, the upper edge of these guide rails 10 lies somewhat lower than the upper edge of the support elements 8 so that the material to be fired (tiles 1) resting on the support elements 8 does not come into contact with the guide rails 10.

In the embodiment illustrated in FIGS. 2 and 3 each tile 1 spans and rests on two support elements 8. In view of the narrow construction of the elongated support elements 8, therefore, the greater part of the surface area of the tile 1 is accessible to heating from below.

Figure 4:
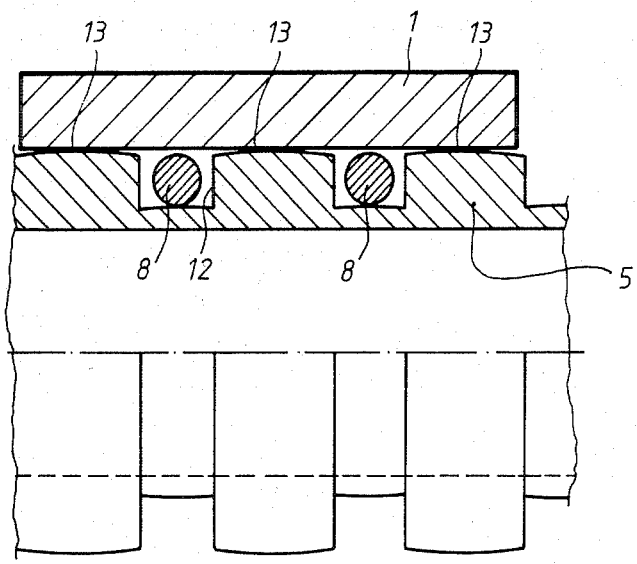
FIG. 4 is a section through a carrier element which at the same time forms the support surface for the ceramic material in the zone of highest temperature.
Figure 5:
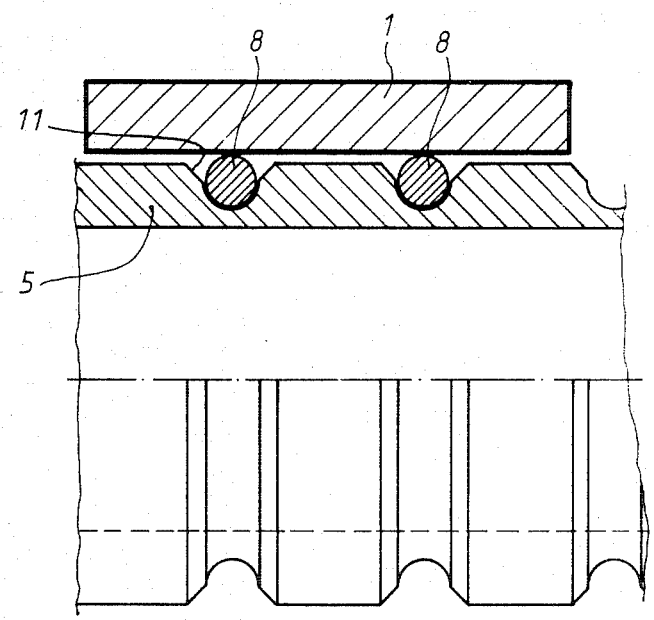
FIG. 5 is a section through a carrier element in which the ceramic material rests on the elongated support sections.

FIGS. 4 and 5 show two variants for achieving a sufficient support surface for the material in the zone of highest temperature (firing zone 3). According to FIG. 5, even in the firing zone 3 the material (tiles 1) rests exclusively on the support elements 8 (which are here constructed as rods of circular cross-section). In order to guide the support elements 8 the rotating carrier elements 5 are provided with guide tracks 11 the depth of which is such that the upper edge of the support elements 8 is higher than the periphery of the carrier elements 5. This solution, in which the support elements therefore provide the sole support for the material to be fired over the whole length of the kiln, is suitable for material in which no deformation beyond the support surface occurs under its own weight during firing. This is the case in particular in the second and third firing of ceramic tiles.

By contrast, FIG. 4 shows a solution for material which can be deformed under the effect of its own weight outside the support surface during firing in the zone of highest temperature (this is the case for example during burning in of ceramic tiles). Here the support surface for the material in the region of the firing zone 3 is formed by the carrier elements 5, namely in the region between adjacent support elements 8. For this purpose the carrier elements 5 are provided with guide tracks 12 the depth of which is greater than the height of the support elements 8. As a result the material (tiles 1) rests on the periphery 13 of the rotating carrier elements 5 in the region of this zone of highest temperature. The relatively close arrangement of successive carrier elements 5 in this firing zone 3 also provides a sufficient support surface for the material to be fired in the transport direction. In this case the carrier elements can conveniently be shaped in order to entrain the material.

Figure 6:
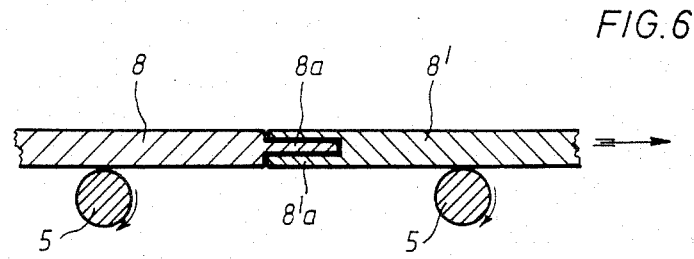
FIG. 6 is a schematic sectional representation of the plug connection of succeeding support elements.

FIG. 6 shows schematically the coupling of successive support elements at their ends 8a, 8'a which are constructed as a type of plug connection. This plug connection is constructed so that it counteracts bending of the connected support elements 8, 8' under the effect of the weight of the material to be fired.

Various further variants are also possible within the scope of the invention.

The support elements can be constructed as hollow sections with any cross-sectional shape so that rapid heating or cooling of the support elements can be achieved in the individual zones of the kiln.

Casings having a somewhat greater diameter can be arranged freely rotatable on the rotating carrier elements and used for possible support of the material (when the material rests on these casings they are rotated with the material by frictional contact, and at the same or differential speed relative to the rotating carrier elements).

If desired, the support elements 8 may be connected by crosspieces made from heat-resistant material (e.g. metal or ceramic fibres) and which can be provided between adjacent support elements in order to collect particles of the material to be fired.

The reverse side of the material to be fired can be a component part of the guiding arrangement for the support elements. For this purpose the reverse side of the ceramic material is advantageously shaped so that on the one hand adjacent support elements are kept apart thereby and on the other hand the material is retained on the support elements against lateral displacement.

I claim:

1. Apparatus for the heat treatment at high temperature of piece material comprising a plurality of rotatable carrier elements, fixed frame means mounting said carrier elements at spaced apart intervals for rotation about fixed, parallel, individual axes; and a plurality of sets of side-by-side, elongate supports extending athwart said carrier elements and resting upon the latter for movement along a path transverse to said axes, said sets of supports being independent of and spaced apart from one another by a distance which is a multiple of their width, each of said supports comprising a plurality of individual, elongate elements of such length as to span adjacent ones of said carrier elements and of such rigidity as to support, with other of said support elements, said piece material without appreciable deformation.

2. Apparatus according to claim 1 characterized in that the spacing between said carrier elements in the zone of highest temperature is less than in other zones.

3. Apparatus according to claim 1 characterized in that said support elements form the sole support for the material to be treated in the zone of highest temperature.

4. Apparatus according to claim 1 characterized in that said carrier elements form the sole support for the material to be treated in the zone of highest temperature.

5. Apparatus according to claim 1 characterized in that said carrier elements and said support elements together form the support for the material to be treated in the zone of highest temperature.

6. Apparatus according to claim 1 characterized in that guide tracks are provided in the carrier elements to guide the support elements along said path.

7. Apparatus according to claim 6 characterized in that the depth of the guide tracks in the region of the zone of highest temperature is greater than the height of the support elements.

8. Apparatus according to claim 6 characterized in that the depth of the guide tracks in the region of the zone of highest temperature is less than the height of the support elements.

9. Apparatus according to claim 6 characterized in that said guide tracks are provided in those carrier elements in the zone of highest temperature.

10. Apparatus according to claim 1 characterized in that fixed guide elements are provided in the region between adjacent carrier elements for the accommodation of said support elements, each of said carrier elements having its upper edge located at a level below that of the upper edge of the associated support elements.

11. Apparatus according to claim 1 characterized in that said support elements have their ends loosely telescoping in the direction of said path.

12. Apparatus according to claim 1 characterized in that the rate of rotation of said carrier elements is such that selected carrier elements downstream of said path rotate more slowly than selected carrier elements upstream of said path.

13. Apparatus according to claim 1 characterized in that adjacent support elements are movable independently of one another along said path.

14. Apparatus according to claim 1 characterized in that the support elements are made from a substance which is substantially stable in shape, resistant to corrosion, and free of scaling in the zone of highest temperature.

15. Apparatus according to claim 14 wherein said substance is selected from the class consisting of temperature-resistant silicon carbide and porcelain, chrome nickel steel, chrome alminum steel, and chrome nickel aluminum titanium steel.

* * * * *